United States Patent
Matsumoto et al.

(10) Patent No.: US 12,422,839 B2
(45) Date of Patent: Sep. 23, 2025

(54) CAUSE ESTIMATION APPARATUS AND CAUSE ESTIMATION METHOD

(71) Applicant: MITSUBISHI HEAVY INDUSTRIES, LTD., Tokyo (JP)

(72) Inventors: Shunsaku Matsumoto, Tokyo (JP); Kuniaki Aoyama, Hyogo (JP); Yasuyuki Ogawa, Tokyo (JP); Takashi Sonoda, Tokyo (JP); Daisuke Kudo, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 427 days.

(21) Appl. No.: 18/015,846

(22) PCT Filed: Oct. 13, 2021

(86) PCT No.: PCT/JP2021/037894
§ 371 (c)(1),
(2) Date: Jan. 12, 2023

(87) PCT Pub. No.: WO2022/085535
PCT Pub. Date: Apr. 28, 2022

(65) Prior Publication Data
US 2023/0259116 A1    Aug. 17, 2023

(30) Foreign Application Priority Data

Oct. 21, 2020   (JP) .................. 2020-176531

(51) Int. Cl.
G05B 13/02   (2006.01)
G05B 23/02   (2006.01)

(52) U.S. Cl.
CPC ............... G05B 23/0275 (2013.01)

(58) Field of Classification Search
CPC .................................... G05B 23/0275
See application file for complete search history.

(56) References Cited

U.S. PATENT DOCUMENTS

2005/0114743 A1* 5/2005 Moorhouse ............ H04L 41/06
714/100
2010/0198555 A1* 8/2010 Takahama ................ F02C 9/00
702/179

(Continued)

FOREIGN PATENT DOCUMENTS

JP  2013-199804 A   10/2013
WO  2017/209167 A1  12/2017

OTHER PUBLICATIONS

International Search Report issued in Application No. PCT/JP2021/037894 mailed on Dec. 21, 2021 (4 pages).

*Primary Examiner* — Ricky Go
(74) *Attorney, Agent, or Firm* — Osha Bergman Watanabe & Burton LLP

(57) ABSTRACT

A cause estimation device includes: an acquisition unit that acquires a measurement value of a target apparatus; a likelihood calculation unit that calculates, in a case where it is assumed that events occur due to a common cause, a likelihood of an occurrence of each of the events based on the measurement value; a table storage unit that stores a cause table in which a cause of occurrence of the event and a frequency of the cause of occurrence are associated with each other for each of the plurality of events; and an estimation unit that rewrites the frequency registered in the cause table into a frequency in the case where it is assumed that the plurality of events occur due to the common cause, and estimates the cause of occurrence based on the rewritten cause table and the likelihood.

10 Claims, 15 Drawing Sheets

(56) References Cited

U.S. PATENT DOCUMENTS

2019/0018402 A1* 1/2019 Enomoto ........... G05B 23/0235
2019/0187676 A1  6/2019 Nagano et al.

* cited by examiner

※ ∩ INDICATES INTERSECTION,
AND OVERLINE INDICATES COMPLEMENT.

FIG. 4

CALCULATED SN RATIO                                    T0

| SIGNAL a | SIGNAL b | SIGNAL c | SIGNAL d | SIGNAL e | SIGNAL f |
|----------|----------|----------|----------|----------|----------|
| 5        | 10       | 2        | 7        | 3        | 2        |

×

SENSOR VALUE TABLE                                     T1

|         | SIGNAL a | SIGNAL b | SIGNAL c | SIGNAL d | SIGNAL e | SIGNAL f |
|---------|----------|----------|----------|----------|----------|----------|
| EVENT A | 0        | 1        | 0        | 0        | 0        | 1        |
| EVENT B | 1        | 0        | 1        | 0        | 0        | 0        |
| EVENT C | 0        | 0        | 0        | 1        | 0        | 0        |
| EVENT D | 0        | 0        | 1        | 0        | 1        | 0        |
| EVENT E | 0        | 0        | 0        | 0        | 0        | 1        |

FIG. 10

| | CAUSE 1 | CAUSE 2 | CAUSE 3 | CAUSE 4 | CAUSE 5 | CAUSE 6 | CAUSE 7 | CAUSE 8 | TOTAL |
|---|---|---|---|---|---|---|---|---|---|
| EVENT A | 2 | 0 | 1 | 0 | 0 | 0 | 0 | 0 | 3 |
| EVENT C | 0 | 2 | 1 | 0 | 0 | 0 | 0 | 0 | 3 |
| EVENT B | 0 | 0 | 0 | 0 | 0 | 0 | 0 | 0 | 0 |
| EVENT D | 0 | 0 | 0 | 0 | 0 | 0 | 0 | 0 | 0 |
| EVENT E | 0 | 0 | 0 | 0 | 0 | 0 | 0 | 0 | 0 |
| TOTAL | 2 | 2 | 2 | 0 | 0 | 0 | 0 | 0 | 6 |

T13

| | OCCURRENCE RATIO |
|---|---|
| CAUSE 1 | 1.0 |
| CAUSE 2 | 0.0 |
| CAUSE 3 | 0.0 |
| CAUSE 4 | 0.0 |
| CAUSE 5 | 0.0 |
| ... | ... |

T14

| | LIKELIHOOD |
|---|---|
| EVENT A | 1.0 |
| EVENT B | 0.0 |
| EVENT C | 0.0 |
| EVENT D | 0.0 |
| EVENT E | 0.0 |

| | CAUSE 1 | CAUSE 2 | CAUSE 3 | CAUSE 4 | CAUSE 5 | CAUSE 6 | CAUSE 7 | CAUSE 8 | TOTAL |
|---|---|---|---|---|---|---|---|---|---|
| EVENT A | 2 | 0 | 1 | 0 | 0 | 0 | 0 | 0 | 3 |
| EVENT C | 0 | 2 | 1 | 0 | 0 | 0 | 0 | 0 | 3 |
| EVENT B | 0 | 0 | 0 | 0 | 0 | 0 | 0 | 0 | 0 |
| EVENT D | 0 | 0 | 0 | 0 | 0 | 0 | 0 | 0 | 0 |
| EVENT E | 0 | 0 | 0 | 0 | 0 | 0 | 0 | 0 | 0 |
| TOTAL | 2 | 2 | 2 | 0 | 0 | 0 | 0 | 0 | 6 |

⇒

T16

| | OCCURRENCE RATIO |
|---|---|
| CAUSE 1 | 1.0 |
| CAUSE 2 | 0.0 |
| CAUSE 3 | 0.0 |
| CAUSE 4 | 0.0 |
| CAUSE 5 | 0.0 |
| ... | ... |

T15

| | SN RATIO |
|---|---|
| EVENT A | 1.0 |
| EVENT B | 1.0 |
| EVENT C | 0.0 |
| EVENT D | 0.0 |
| EVENT E | 0.0 |

FIG. 14

| OCCURRENCE EVENT | CAUSE NAME | CAUSE ACCURACY % | SIGNIFICANT CHANGE IN DATA OF MEASUREMENT POINT GROUP | CAUSE ACCURACY % (AFTER NARROWING-DOWN) |
|---|---|---|---|---|
| CHANGE IN PERFORMANCE OF PLANT | DEFECT IN CONTROL SYSTEM | 5 | - | 16 |
| | CHANGE IN PERFORMANCE OF EXHAUST GAS BOILER | 15 | ABSENT | 0 |
| | CHANGE IN PERFORMANCE OF AUXILIARY DEVICE | 20 | - | 31 |
| | MALFUNCTION IN VALVE A (TRUE CAUSE) | 30 | - | 41 |
| | MALFUNCTION IN VALVE B | 25 | ABSENT | 0 |
| | CHANGE IN PERFORMANCE OF GT | 4 | ABSENT | 0 |
| | CHANGE IN PERFORMANCE OF GENERATOR | 1 | - | 12 |
| | TOTAL | 100 | | 100 |

DISTRIBUTE SUM 15 + 25 + 4 = 44 OF CAUSE ACCURACIES NARROWED DOWN TO CAUSE ACCURACIES OF REMAINING FOUR CAUSES.

CAUSE ESTIMATION APPARATUS AND CAUSE ESTIMATION METHOD

TECHNICAL FIELD

The present disclosure relates to a cause estimation device, a cause estimation method, and a storage medium storing a program for estimating a cause of occurrence of an event. Priority is claimed on Japanese Patent Application No. 2020-176531, filed Oct. 21, 2020, the content of which is incorporated herein by reference.

BACKGROUND ART

Apparatuses that support social infrastructure such as power generation facilities, plants, and various industrial machines require long-term reliability. PTL 1 discloses a monitoring system that monitors an operating state of an apparatus. The monitoring system disclosed in PTL 1 estimates, as an anomaly indication of a gas turbine, based on SN ratios of sensor signals that affect an increase in a Mahalanobis distance in a Mahalanobis-Taguchi method (MT method), an occurrence of an anomalous event associated with a sensor signal having a large SN ratio, and estimates, based on the estimated anomalous event and a table in which events and causes of occurrence thereof are associated with each other, a cause of occurrence of the anomalous event that occurs in a target apparatus. In a method described in PTL 1, it is assumed that a plurality of events occur independently.

CITATION LIST

Patent Literature

[PTL 1] Pamphlet of International Publication No. WO2017/209167

SUMMARY OF INVENTION

Technical Problem

When a cause of occurrence of an event is estimated on the assumption that events occur independently, an estimation precision of the cause of occurrence may decrease in a case where a plurality of events occur due to a common cause. For example, in a case where an event A and an event B occur due to a common cause 1 and the event A occurs due to a cause 2, the common cause 1 may be estimated as a cause of occurrence with a high probability even though the event A occurs independently, or the cause 2 may be estimated as a cause of occurrence with a higher probability than the common cause 1 in a situation where the event A and the event B occur at the same time.

Solution to Problem

A cause estimation device of the present disclosure includes: an acquisition unit that acquires a measurement value of a target apparatus; a likelihood calculation unit that calculates, in a case where it is assumed that a plurality of events that occur in the target apparatus occur due to a common cause, a likelihood of an occurrence of each of the events based on the measurement value acquired by the acquisition unit; a table storage unit that stores a cause table in which a cause of occurrence of the event and a frequency of the cause of occurrence are associated with each other for each of the plurality of events; and an estimation unit that rewrites the frequency registered in the cause table into a frequency in the case where it is assumed that the plurality of events occur due to the common cause, and estimates the cause of occurrence based on the rewritten cause table and the likelihood.

A cause estimation method of the present disclosure includes: a step of acquiring a measurement value of a target apparatus; a step of calculating, in a case where it is assumed that a plurality of events that may occur in the target apparatus occur due to a common cause, a likelihood of an occurrence of each of the events based on the acquired measurement value; and a step of rewriting a frequency registered in a cause table in which a cause of occurrence of the event and the frequency of the cause of occurrence are associated with each other for each of the plurality of events, into a frequency in the case where it is assumed that the plurality of events occur due to the common cause, and estimating the cause of occurrence based on the rewritten cause table and the likelihood.

A non-transitory computer-readable storage medium storing a program of the present disclosure causes a computer to execute: acquiring a measurement value of a target apparatus; calculating, in a case where it is assumed that a plurality of events that may occur in the target apparatus occur due to a common cause, a likelihood of an occurrence of each of the events based on the acquired measurement value; and rewriting a frequency registered in a cause table in which a cause of occurrence of the event and the frequency of the cause of occurrence are associated with each other for each of the plurality of events, into a frequency in the case where it is assumed that the plurality of events occur due to the common cause, and estimating the cause of occurrence based on the rewritten cause table and the likelihood.

According to the cause estimation device, the cause estimation method, and the storage medium storing the program described above, a cause of an event can be estimated with good precision.

BRIEF DESCRIPTION OF DRAWINGS

FIG. 4 is a diagram describing a process of S7 in the flowchart of FIG. 3.

FIG. 10 is a first diagram describing a cause table correction process according to the second embodiment.

FIG. 11 is a second diagram describing the cause table correction process according to the second embodiment.

FIG. 14 is a diagram describing a cause narrowing-down process according to the third embodiment.

DESCRIPTION OF EMBODIMENTS

First Embodiment

Hereinafter, a cause estimation device according to a first embodiment of the present disclosure will be described with reference to FIGS. 1 to 8.
(Configuration)

Figure 1:
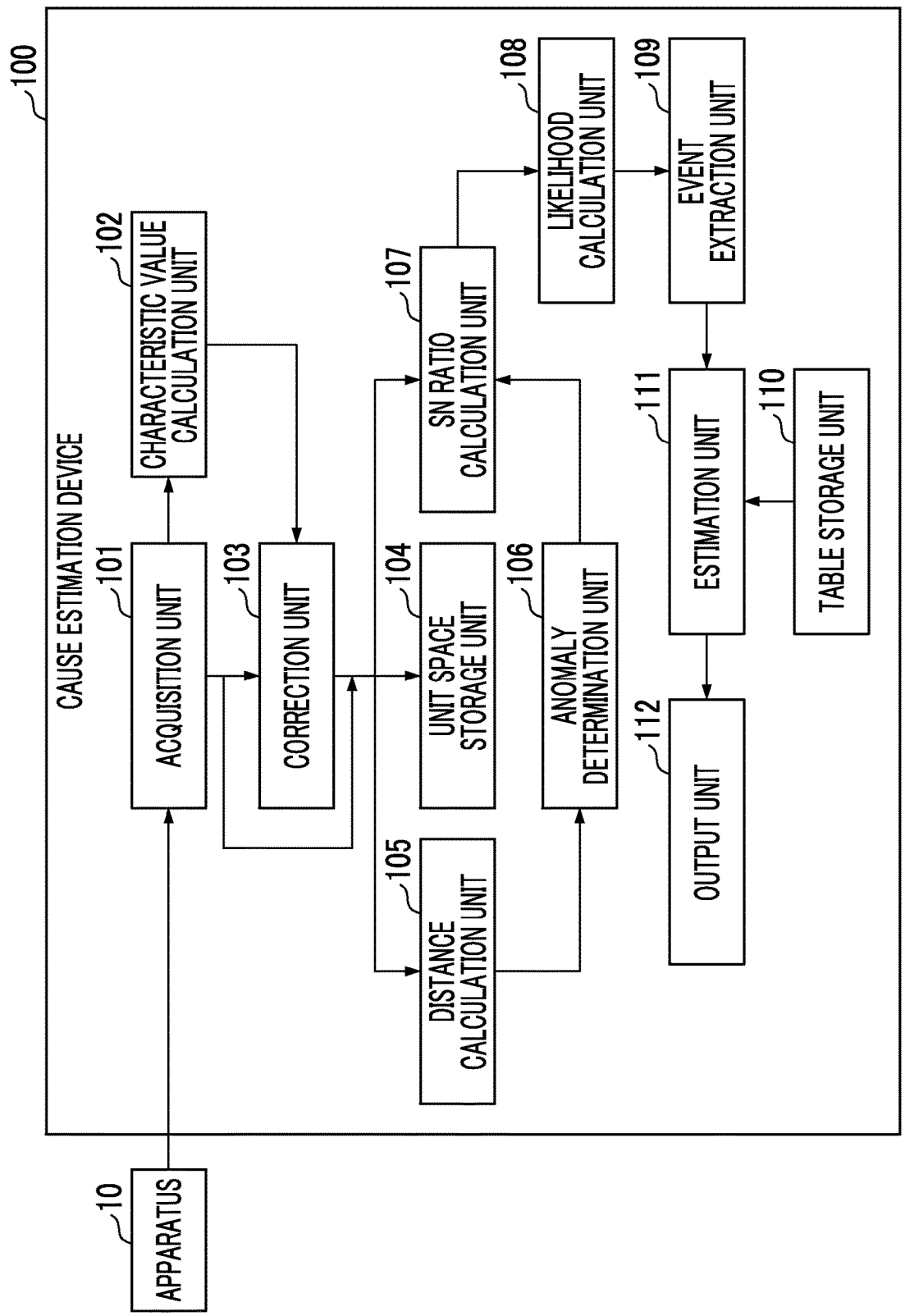
FIG. 1 is a block diagram showing an example of a cause estimation device according to a first embodiment.

FIG. 1 is a block diagram showing an example of the cause estimation device according to the first embodiment.

A cause estimation device 100 is a device that detects an anomalous event that has occurred in an apparatus 10 to be monitored and estimates a cause thereof. The apparatus 10 is a power generation facility, a plant, and various industrial machines. Hereinafter, a case where the apparatus 10 is a gas turbine will be described as an example. As illustrated, the cause estimation device 100 includes an acquisition unit 101, a characteristic value calculation unit 102, a correction unit 103, a unit space storage unit 104, a distance calculation unit 105, an anomaly determination unit 106, and an SN ratio calculation unit 107, a likelihood calculation unit 108, an event extraction unit 109, a table storage unit 110, an estimation unit 111, and an output unit 112.

The acquisition unit 101 acquires a sensor value acquired by a sensor provided in the target apparatus 10 and a value (command value) of a control signal of the target apparatus 10. For example, the acquisition unit 101 acquires temperatures of air and a fuel (input fluid) input to the gas turbine and a temperature of an exhaust (output fluid) output from the gas turbine.

The characteristic value calculation unit 102 calculates a characteristic value indicating a characteristic of the apparatus 10 based on the sensor value acquired by the acquisition unit 101. Examples of characteristic value include thermal efficiency, compressor efficiency, combustion efficiency, turbine efficiency, compressor power, turbine output, gas turbine air flow rate, gas turbine exhaust flow rate, compressor pressure ratio, and turbine inlet combustion gas temperature. For example, the characteristic value calculation unit 102 calculates the compressor efficiency (characteristic value) by dividing the difference between a compressor outlet enthalpy and a compressor inlet enthalpy in an isentropic change by the difference between a compressor outlet enthalpy and a compressor inlet enthalpy in reality. The enthalpy is calculated using a temperature and a pressure which are sensor values.

The correction unit 103 corrects the sensor value acquired by the acquisition unit 101 and the characteristic value calculated by the characteristic value calculation unit 102 using a predetermined method. For example, the correction unit 103 corrects the sensor value and the characteristic value based on a thermal equilibrium calculation of the gas turbine to obtain a corrected measurement value. Specifically, first, the correction unit 103 substitutes the measurement value into a predetermined thermal equilibrium equation related to the gas turbine, and calculates an error of each measurement value so that the equation is established. Then, the correction unit 103 obtains the sum of the errors calculated for each measurement value or the sum of the squares of the errors, and selects a combination of the errors for each measurement value at which the obtained sum is the minimum, thereby obtaining the corrected measurement value.

The unit space storage unit 104 stores a combination of state quantities (measurement values, corrected measurement values, and command values) acquired in a normal operation state of the apparatus 10 (for example, a period of two weeks from the latest time point of an operation start time point of the gas turbine in a new product condition or an operation start time point of the gas turbine after the completion of a periodic inspection), as a unit space of a Mahalanobis distance.

The distance calculation unit 105 calculates the Mahalanobis distance indicating the state of the apparatus 10 based on the unit space stored in the unit space storage unit 104 using the sensor value and the command value acquired by the acquisition unit 101, the characteristic value calculated by the characteristic value calculation unit 102, and the corrected measurement value corrected by the correction unit 103 as specifications. The Mahalanobis distance is a measure of a magnitude of the difference between a reference sample expressed as the unit space and a newly obtained sample. Since a method of calculating the Mahalanobis distance is known, description thereof will be omitted in the present specification. However, for example, PTL 1 describes a specific calculation method.

The anomaly determination unit 106 determines whether or not an anomaly has occurred in the apparatus 10 based on the Mahalanobis distance calculated by the distance calculation unit 105. Specifically, the anomaly determination unit 106 determines that an anomaly has occurred in the apparatus 10 in a case where the Mahalanobis distance is equal to or more than a predetermined threshold.

In a case where the anomaly determination unit 106 determines that an anomaly has occurred in the apparatus 10, the SN ratio calculation unit 107 calculates an signal-noise ratio (SN ratio) related to the Taguchi method based on the sensor value and the command value acquired by the acquisition unit 101, the characteristic value calculated by the characteristic value calculation unit 102, and the corrected measurement value corrected by the correction unit 103. That is, the likelihood calculation unit 108 obtains a larger-the-better SN ratio of the presence or absence of an item by orthogonal table analysis. It can be determined that the larger the SN ratio is, the higher the possibility that an item of a state quantity (measurement value, command value) is anomalous. Hereinafter, the SN ratio according to the Taguchi method will be simply referred to as an SN ratio.

The likelihood calculation unit 108 calculates a likelihood of an occurrence of each of a plurality of events that can occur in the apparatus 10 based on the SN ratio calculated by the SN ratio calculation unit 107. Examples of the events include a decrease in gas turbine output, a decrease in gas turbine efficiency, a decrease in compressor efficiency, a decrease in turbine efficiency, a decrease in the amount of air at a compressor inlet, an increase in exhaust temperature, a decrease in a compressor compression ratio, a decrease in combustion efficiency, an increase in turbine inlet gas temperature, and an increase in exhaust gas pressure. For example, the likelihood calculation unit 108 stores, for each event, a relationship with a state quantity in which the presence or absence of the occurrence of the event predominantly contributes to an increase or decrease in the SN ratio, and calculates a weighted sum of SN ratios of quantities associated with each event, thereby calculating the likelihood of the occurrence of each event. The likelihood calculation unit 108 performs a process of taking into consideration simultaneity of events (that a plurality of events occur at the same time) with respect to the weighted sum of the SN ratios.

The event extraction unit 109 extracts events of which the likelihood calculated by the likelihood calculation unit 108 is equal to or more than a predetermined threshold, from the plurality of events that can occur in the apparatus 10.

The table storage unit 110 stores a cause table that represents a relationship between events and causes of occurrence of the events. In the cause table, for each event and each cause of occurrence, the number of times the event is confirmed when an anomaly occurs due to the cause of occurrence is registered. For example, when an anomaly has occurred due to damage (cause of occurrence) of an exhaust diffuser in the past, in a case where a state (event) in which a deviation of a blade path temperature is large has been confirmed 9 times, the number of times "9" is registered in the cause table in association with the cause of occurrence "damage of the exhaust diffuser" and the event "the state (event) in which the deviation of the blade path temperature is large". The cause of occurrence registered in the cause table can be generated, for example, based on FTA (fault tree (FT)) data generated by maintenance personnel during an operation of the apparatus 10.

Alternatively, for each event and each cause of occurrence, a probability that the event occurs when an anomaly occurs due to the cause of occurrence may be registered in the cause table. The cause table can be generated, for example, based on FTA (fault tree (FT)) data generated by maintenance personnel during an operation of the apparatus 10. FT is a tree structure in which a top event is a highest event (root) and a lower event that is a cause of a higher event is a node. Each node is associated with a probability that a higher event related to a node immediately above the node occurs due to a lower event indicated by the node. A cause table may be generated by storing in a table a probability associated with a node indicating each event in the FT.

The number of occurrences of an event registered in the cause table and the probability of an event occurring are collectively referred to as an occurrence frequency.

The estimation unit 111 estimates a cause of occurrence of an anomaly occurring in the apparatus 10 based on the likelihood of the occurrence of each event calculated by the likelihood calculation unit 108 and the cause table stored in the table storage unit 110. The estimation unit 111 rewrites the frequency information (the number of occurrences or probability of occurrence) of events registered in the cause table into frequency information in a case where it is assumed that a plurality of events occur due to a common cause, and estimates a cause of occurrence using the rewritten cause table. The estimation unit 111 calculates, for each cause of occurrence of an anomaly, the likelihood of the cause of occurrence by the weighted sum of the likelihood (the likelihood in consideration of simultaneity) of the occurrence of each event and the occurrence frequency (occurrence frequency in consideration of simultaneity) of the event, and estimates the cause of occurrence based on the likelihood.

The output unit 112 outputs the cause of occurrence estimated by the estimation unit 111 in order of likelihood. Examples of the output include display on a display, output to an electronic file, transmission of data to the outside, printing on a sheet, and audio output.

(Operation)

Next, an operation of the cause estimation device 100 in a case where it is assumed that the occurrences of the events A to E have the relationship shown in FIG. 2B will be described.

Figure 3:
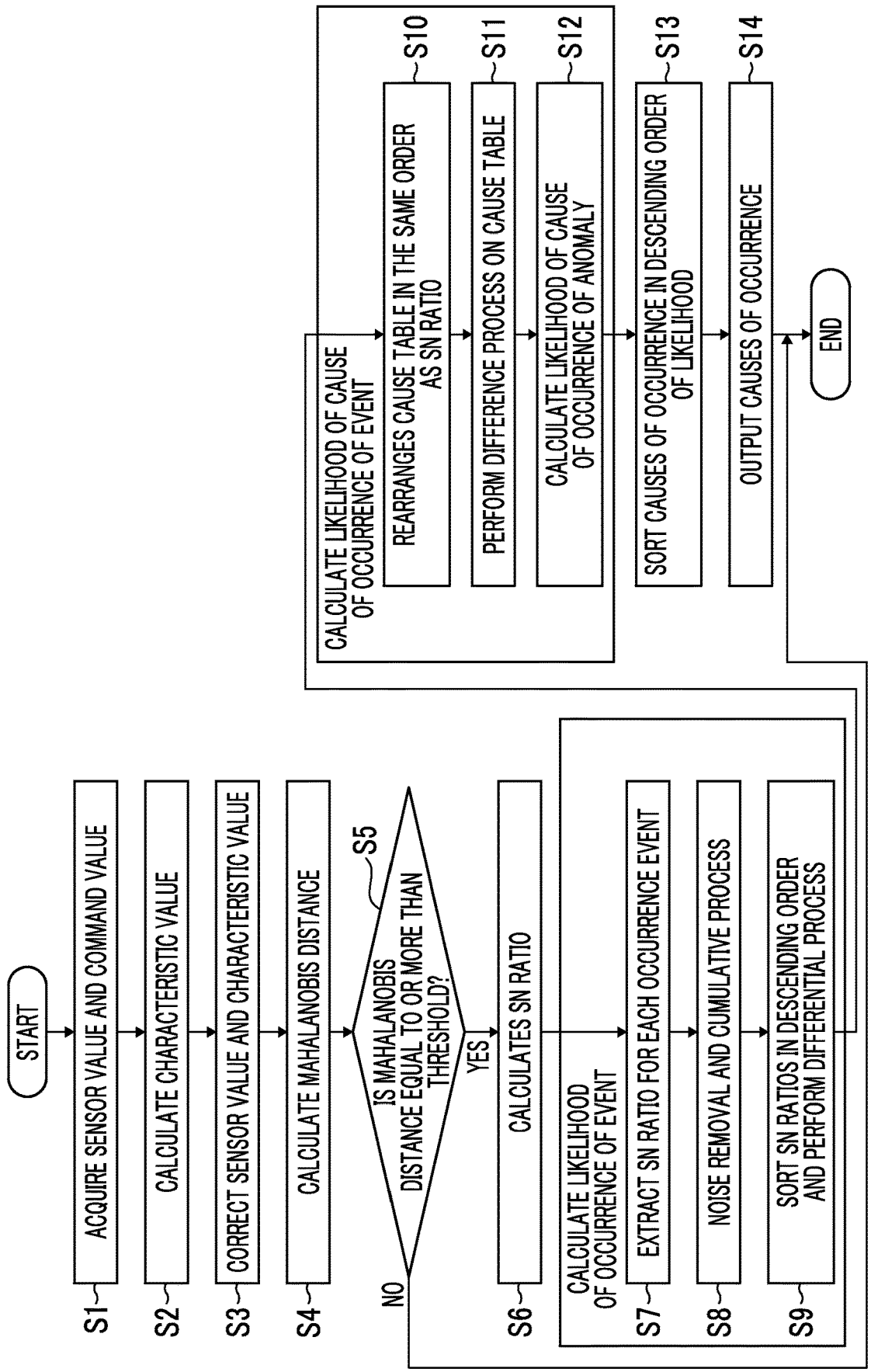
FIG. 3 is a flowchart showing an example of a cause estimation process according to the first embodiment.
Figure 5:
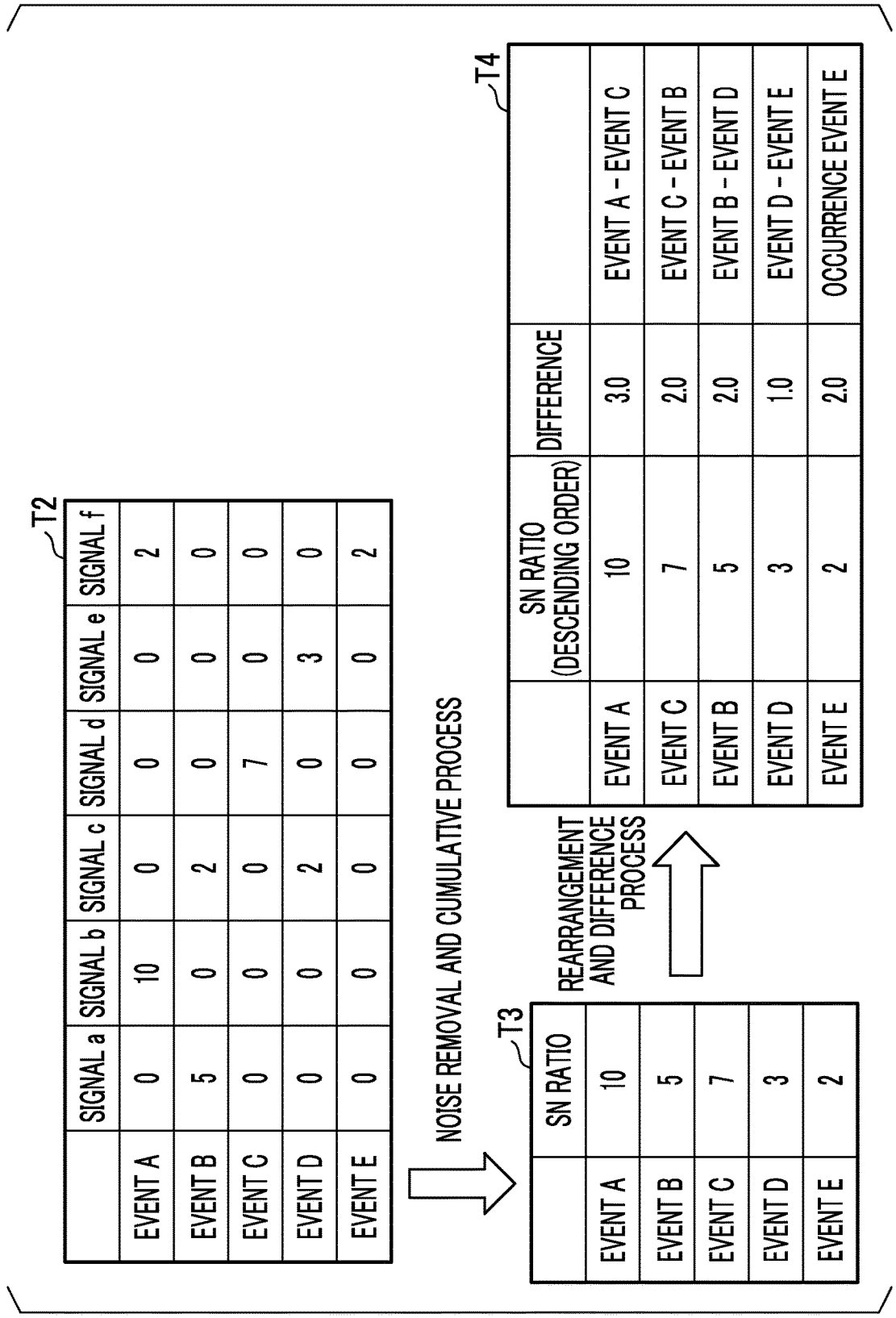
FIG. 5 is a diagram describing processes of S8 to S9 in the flowchart of FIG. 3.

FIG. 3 is a flowchart showing an example of a cause estimation process according to the first embodiment.

The cause estimation device 100 collects the state quantities of the apparatus 10 during a start-up period of the apparatus 10 (during a normal operation state), and accumulates a combination of the state quantities in the unit space storage unit 104. For example, the cause estimation device 100 records the command value of the apparatus 10 acquired by the acquisition unit 101 and the corrected measurement value generated by the correction unit 103 in association with each other in the unit space storage unit 104. The cause estimation device 100 executes the following monitoring operation at a predetermined monitoring timing (for example, every hour) after the start-up period of the apparatus 10 has elapsed. The monitoring timing is an example of a post-starting time point that is a time point after a predetermined start-up period has elapsed from an operation start time point of the apparatus 10.

When the cause estimation device 100 starts monitoring, the acquisition unit 101 acquires the sensor value acquired by the sensor provided in the apparatus 10 and the command value imparted to the apparatus 10 (step S1). Next, the characteristic value calculation unit 102 calculates the characteristic value indicating the characteristic of the apparatus 10 based on the sensor value acquired by the acquisition unit 101 (step S2). Next, the correction unit 103 corrects the sensor value and the characteristic value by a predetermined method to obtain the corrected measurement value (step S3). For example, in a case where the apparatus 10 is the gas turbine, the correction unit 103 corrects the sensor value and the characteristic value based on the thermal equilibrium calculation of the gas turbine.

Next, the distance calculation unit 105 calculates the Mahalanobis distance based on the unit space stored in the unit space storage unit 104 using the sensor value and the command value acquired in step S1, the characteristic value calculated in step S2, and the corrected measurement value obtained in step S3 as specifications (step S4). Next, the anomaly determination unit 106 determines whether or not the calculated Mahalanobis distance is equal to or more than the predetermined threshold (step S5). In a case where the Mahalanobis distance is less than the threshold (No in S5), step the anomaly determination unit 106 determines that no anomaly has occurred in the apparatus 10, ends the monitoring process, and waits for the next monitoring timing.

On the other hand, in a case where the Mahalanobis distance is equal to or more than the threshold (Yes in step S5), the anomaly determination unit 106 determines that an anomaly has occurred in the apparatus 10. When the anomaly determination unit 106 determines that an anomaly has occurred in the apparatus 10, the SN ratio calculation unit 107 calculates the SN ratio related to the Taguchi method by a known method for each of the command value acquired in step S1 and the corrected measurement value obtained in step S3 (step S6).

Next, the likelihood calculation unit 108 calculates the likelihood of the occurrence of each of the plurality of events that can occur in the apparatus 10 based on the calculated SN ratio (steps S7 to S9).

First, the likelihood calculation unit 108 extracts an SN ratio for each occurrence event (step S7). FIG. 4 is referred to. The likelihood calculation unit 108 reads a sensor value table T1 stored in the likelihood calculation unit 108. In the sensor value table T1, a degree of contribution of the SN ratio calculated for each of the command value and the corrected measurement value to each event is set for each event. For example, assuming that SN ratios illustrated in a table TO are calculated for signals a to f, in the sensor value table T1, for each of the events A to E, among the signals a to f, the signals related to the event are set as "1", and the signals having no relation are set as "0". The likelihood calculation unit 108 extracts the SN ratio for each event by multiplying the SN ratio calculated in step S6 by the set value for each signal set in the sensor value table T1. For example, in the case of the event A, the likelihood calculation unit 108 performs a calculation, such as calculating "0" by multiplying the calculated SN ratio "5" of the signal a by the set value "0" of the sensor value table T1, and calculating "10" by multiplying the calculated SN ratio "10" of the signal b by the set value "1" of the sensor value table T1, on the signals a to f. The likelihood calculation unit 108 performs the same calculation on the events B to E. The calculated values are shown in a table T2 of FIG. 5. Accordingly, the SN ratio of the signal related to each event is extracted.

Next, noise removal and a cumulative process are executed (step S8). The noise removal is a process of extracting the top N signals in order from the signal having the largest value among the signals having an SN ratio equal to or more than a predetermined threshold X. The cumulative process is a process in which the SN ratios after the noise removal are totaled for each event. As an example, assuming that X=1 and N=1, the event extraction unit 109 selects one SN ratio having a value of 1 or more in descending order. The likelihood calculation unit 108 performs a process of accumulating the SN ratios selected by the event extraction unit 109 (one is accumulated). An example of a cumulative value of the SN ratio for each event after the noise removal and cumulative process in this example is shown in a table T3 of FIG. 5.

Next, the likelihood calculation unit 108 sorts the events in descending order of SN ratio cumulative value based on the cumulative values of the SN ratios, and performs a difference process (step S9). The likelihood calculation unit 108 arranges the SN ratio cumulative values in descending order, and calculates the difference between the SN ratio of each event and the SN ratio of the event one rank lower. For example, in the case of the table T3, when the SN ratio cumulative values are rearranged in descending order, the order is the event A, the event C, the event B, the event D, and the event E. Next, the likelihood calculation unit 108 calculates "3.0" by subtracting the SN ratio of the second-ranked event C from the SN ratio of the first-ranked event A, and records the value in the table storage unit 110 in association with the event A. Similarly, the likelihood calculation unit 108 calculates each of a value "2.0" obtained by subtracting the SN ratio of the third-ranked event B from the SN ratio of the second-ranked event C, a value "2.0" obtained by subtracting the SN ratio of the fourth-ranked event D from the SN ratio of the third-ranked event B, a value "1.0" obtained by subtracting the SN ratio of the fifth-ranked event E from the SN ratio of the fourth-ranked event D, and records the values in the table storage unit 110 in association with the events C, B, and D, respectively. For the lowest event E, the likelihood calculation unit 108 does not calculate the difference, and records the SN ratio of the event E in the table storage unit 110 in association with the event E.

Figure 2A:
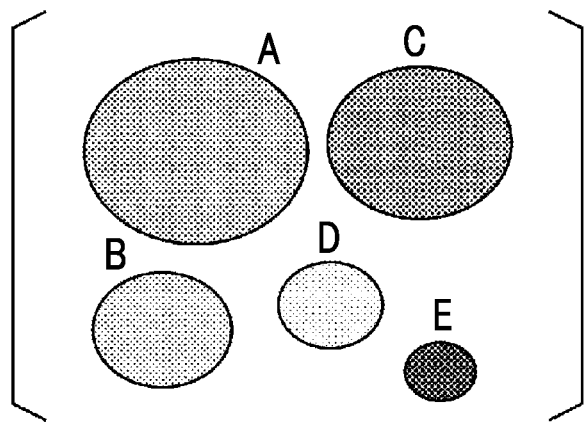
FIG. 2A is a first diagram describing simultaneity of occurrence events.
Figure 2B:
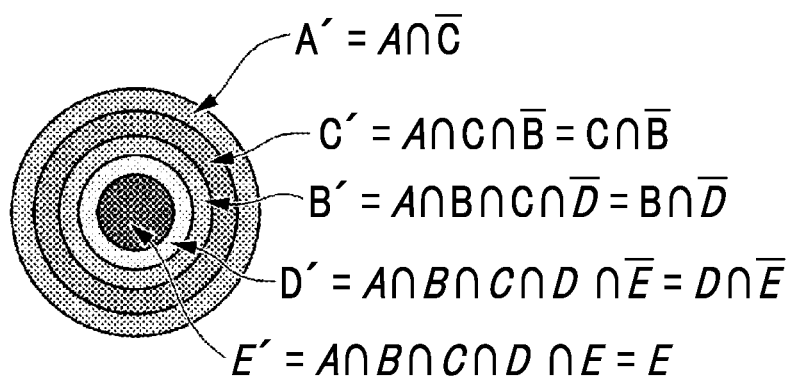
FIG. 2B is a second diagram describing the simultaneity of the occurrence events.

This process corresponds to the calculation of the areas A' to E' in FIG. 2B. For example, 3.0 associated with the event A corresponds to an SN ratio at which the event A occurs independently, and 2.0 associated with the event C corresponds to an SN ratio at which only the event C and the event A occur. The value obtained by the difference process is the likelihood of each event when the simultaneity of the events is taken into consideration.

Next, the estimation unit 111 calculates the likelihood of the cause of occurrence of the event (steps S10 to S12). The estimation unit 111 performs sorting and the difference process based on the SN ratio on the cause table in the same manner as the likelihood of the occurrence of the event, and performs a process of rewriting the cause table in consideration of the simultaneity of the events.

Figure 6:
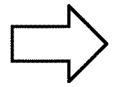
FIG. 6 is a diagram describing a process of S10 in the flowchart of FIG. 3.

First, the estimation unit 111 rearranges the cause table in the same order as the SN ratio (step S10). An example of a cause table T5 is shown in FIG. 6. In the cause table T5, for each event and for each cause of occurrence, an occurrence frequency of an event is set according to the cause of occurrence. The occurrence frequency is, for example, the number of times or a probability that an event has occurred due to the cause of occurrence, based on past actual results. For example, a setting example of the cause table T5 illustrated shows that, regarding the event A, the event A occurs 10 times due to a cause 1, the event A occurs 10 times due to a cause 2, and the event A occurs 4 times due to a cause 3. The cause table T5 is created based on an analysis result of causes for each event by FTA and past accident cases, and is stored in the table storage unit 110. The estimation unit 111 rearranges the cause table T5 in the same rearranged order as in step S9 (that is, in descending order of SN ratio). A cause table T6 after the rearrangement is shown in FIG. 6.

Figure 7:
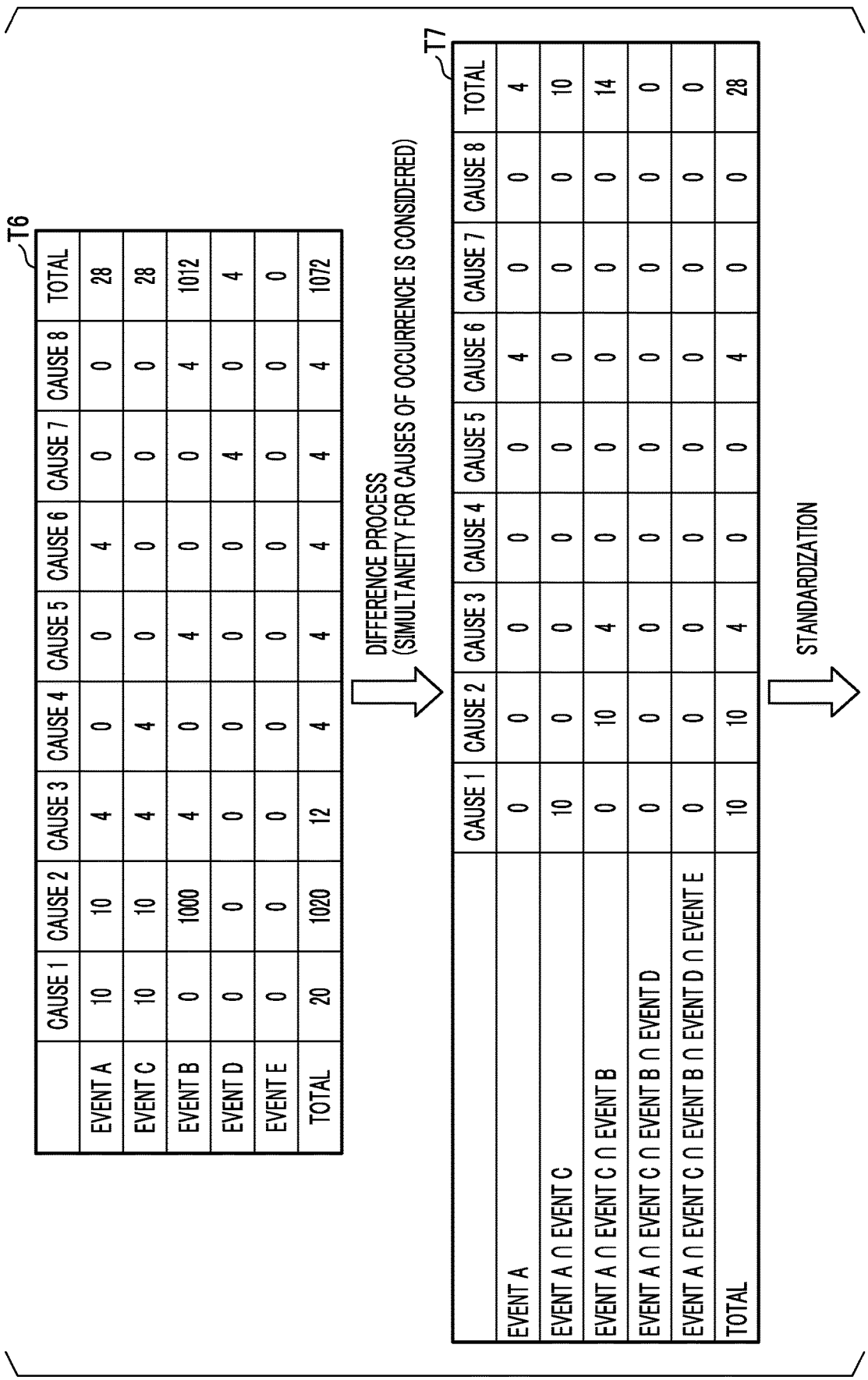
FIG. 7 is a diagram describing a process of S11 in the flowchart of FIG. 3.
Figure 8:
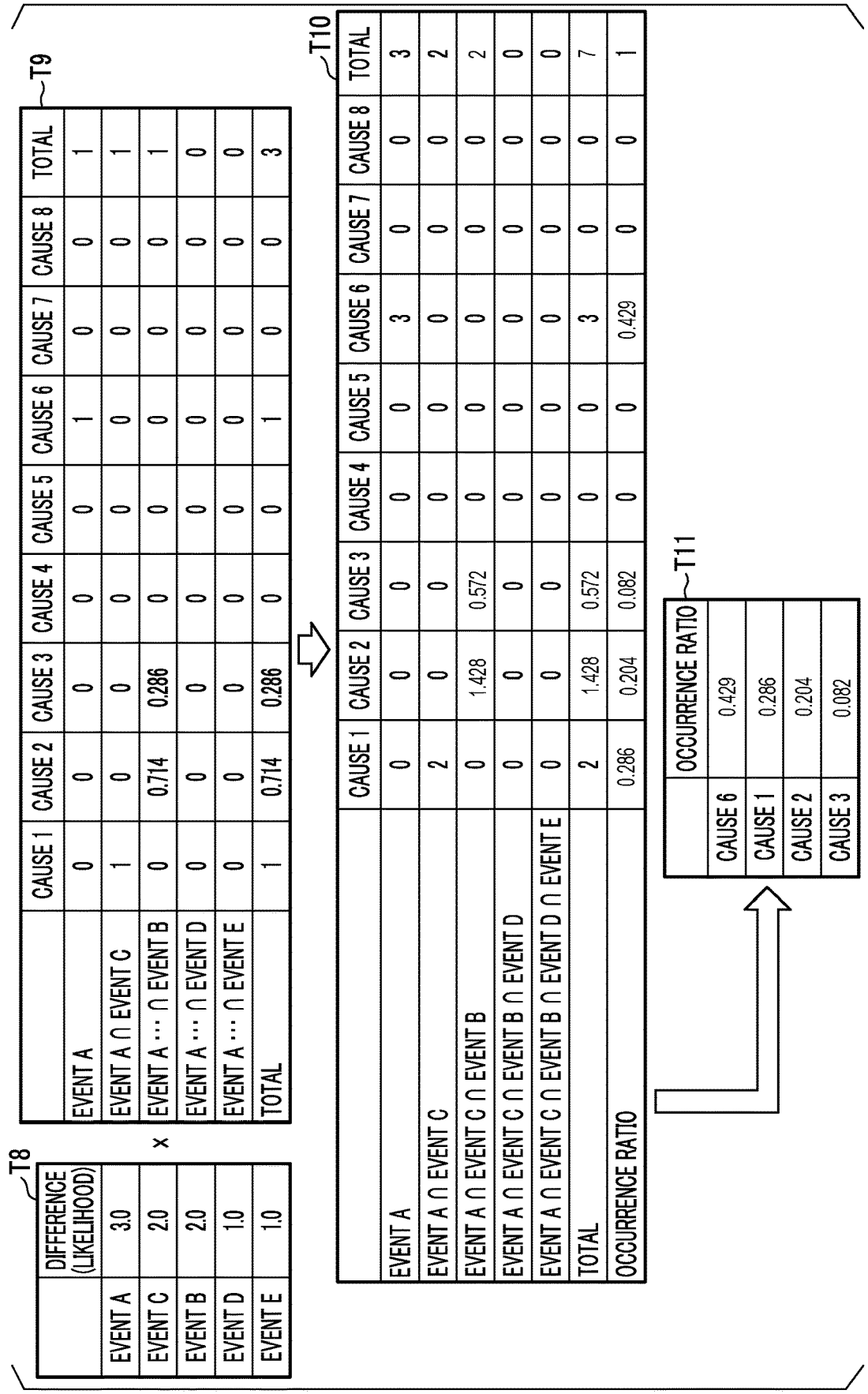
FIG. 8 is a diagram describing processes of S12 to S13 in the flowchart of FIG. 3.

Next, the estimation unit 111 performs the difference process on the cause table T6 after the rearrangement (step S11). The difference process will be described with reference to FIG. 7. In the difference process of the cause table, for a value indicating a frequency of each cause, as in the case of the SN ratio, a process of subtracting, from a value of a rank, a value of the one lower rank. For example, for the cause 1, "10" of the event C is subtracted from "10" of the event A, and the subtracted value "0" is recorded in the table storage unit 110 in association with the event A. For the cause 1, "0" of the event B is subtracted from "10" of the event C, and the subtracted value "10" is recorded in the table storage unit 110 in association with the event A∩ the event C. Accordingly, contents of the cause table T6 are rewritten into the registered contents that the event A and the event C have occurred 10 times due to the cause 1. Regarding the cause 2, "10" of the event C is subtracted from "10" of the event A, the subtracted value "0" is associated with the event A, "1000" of the event B is subtracted from "10" of the event C, the subtracted value "0" (a negative value is rounded up to 0) is associated with the event A∩ the event C, "0" of the event D is subtracted from "1000" of the event B, the subtracted value "1000" is rounded to "10", and "10" is recorded in the table storage unit 110 in association with the event A∩ the event C∩ the event B. Here, the reason why "1000" is rounded to "10" of the event C or the event A is based on the assumption that the inclusion relationship shown in FIG. 2B is established between the events A to E. That is, when the event B occurs, the event C and the event A always occur. Therefore, it is considered that the event B does not exceed 10, which is the number of times that the cause 2 is the cause of occurrence of the events A and C, so that 1000 is set to 10. When the same process is performed on the cause 3, "0" is associated with the event A, "0" is associated with the event A∩ the event C, and "4" is associated with the event A∩ the event C∩ the event B. Next, when a cause 4 is examined, since it is considered that there is no possibility that the event C occur and the event A does not occur, "4" set in the cause 4 of the event C is truncated to "0". Similarly, regarding a cause 5, since it is considered that there is no possibility that the event B occurs and the event C or the event A does not occur, "4" set in the cause 5 of the event B is truncated to "0". The same applies to a cause 7 and a cause 8. Next, a cause 6 will be examined. In the cause 6, "4" is set for the event A, and "0" is set for the other events B to E. Here, with reference to FIG. 2B, since it is assumed that the event A can occur independently, "0" of the event B is subtracted from the "4" of the event A, and the subtracted value "4" is recorded in the table storage unit 110 in association with the event A. The above is the difference process that reflects the simultaneity (a dependence relationship of occurrences of events, inclusion relationship) of the values indicating the frequencies for each cause in the cause table. FIG. 7 shows a cause table T7 after the difference process. For example, in a first row of the table T7, the frequency of each cause when the event A occurs independently is set. In a second row of the table T7, the frequency of each cause when the event A and the event C occur is set. The estimation unit 111 performs a standardization process on the cause table T7. The standardization process is a process of adjusting each value of the events A to E so that the total of the values set in the causes 1 to 8 is 1. FIG. 8 shows a cause table T9 after the standardization process.

Next, the estimation unit 111 calculates the likelihood of the cause of occurrence of the anomaly (step S12). The estimation unit 111 calculates the likelihood of the cause of occurrence of the anomaly for each event by multiplying the likelihood of each event shown in a table T8 of FIG. 8 by the value of each cause in a corresponding row of the cause table T9. For example, the estimation unit 111 multiplies the likelihood "3.0" of the event A by each value in a first row of the cause table T9, multiplies the likelihood "2.0" of the event C by each value in a second row of the cause table T9, and multiplies the likelihood "2.0" of the event B by each value in a third row of the cause table T9. The same applies to the events D and E. A multiplication result is shown in a table T10 of FIG. 8. Next, the estimation unit 111 totals the values for each cause. The totals of the causes of the causes 1 to 8 are "2", "1.428", "0.572", "0", "0", "3", "0", and "0". Next, the estimation unit 111 performs the standardization process on the calculated total value. For example, in the case of the table T10 of FIG. 8, the sum of the totals of the causes is "7". When the standardization process is performed, "2"÷"7"="0.286 . . . " for the cause 1, "1.428"÷"7"="0.204 . . . " for the cause 2, and the like are obtained.

Next, the estimation unit 111 sorts the causes 1 to 8 in descending order of the values of the likelihoods of the causes of occurrence after the standardization process (step S13). A sorting result is shown in a table T11 of FIG. 8 (excluding those having an occurrence ratio of 0). Then, the output unit 112 outputs the causes of occurrence estimated by the estimation unit 111 in the sorted order (step S14). For example, the output unit 112 displays the table T11 on a display. Alternatively, the output unit 112 causes the display to display the cause of occurrence having the highest likelihood, and in a case where a display command for the next cause of occurrence is received by a user's operation, may cause the display to display the cause of occurrence having the next highest likelihood. For example, the output unit 112 outputs a list of causes of occurrence to an electronic file in descending order of likelihood or prints the list on a sheet.

As described above, according to the first embodiment, the cause estimation device 100 calculates the likelihood of the occurrence of each of the plurality of events that can occur in the apparatus 10 in consideration of the simultaneity of the occurrences of the events, rewrites the table showing the relationship between the events and the causes of occurrence of anomalies in consideration of the simultaneity of the occurrences of the events, and estimates the cause of occurrence of the anomaly based on the likelihood and the rewritten table. Accordingly, even in a case where a plurality of events occur due to a common cause and there is a relationship shown in FIG. 2B between the events, the likelihood of the cause of occurrence of each event is calculated based on the likelihood of each event excluding those that have occurred due to the other events (likelihood excluding occurrence likelihoods of events having a smaller likelihood) and the occurrence frequency for each cause excluding those that have occurred due to the other events. Therefore, the likelihood of the cause of occurrence of each event is calculated without being affected by the dependence relationship (inclusion relationship) of the events, and the cause of occurrence is estimated based on the likelihood, so that the cause of occurrence of the anomaly can be estimated with good precision.

For example, in a case where there is a relationship in which an SN ratio of an event A includes a SN ratio of an event B, and in a case where the event A and the event B occur due to a common cause 1, and only the event A occurs due to a cause 2, in a method in the related art, a likelihood of a cause of occurrence is calculated by multiplying a likelihood of each event and an occurrence frequency of a cause table without performing the difference process ins steps S9 and S11. For this reason, for example, even when an SN ratio pattern indicating that the event A occurs independently is obtained, there is a possibility that a likelihood of the common cause 1 as the cause of occurrence of the event A is calculated as the same value as that of the cause 2. According to the present embodiment, by the difference process in steps S9 and S11, the likelihood of the cause 2 as the cause of occurrence of the event A is calculated as a value higher than that of the common cause 1. That is, according to the present embodiment, it is possible to improve an estimation precision of the cause of occurrence of the event in a case where a plurality of events can occur at the same time.

In general, in a case of estimating a cause of occurrence in consideration of simultaneity of events, various simultaneous probability design methods such as the Bayesian probability method are often used. However, for example, in order to stochastically handle simultaneous events such as a simultaneous occurrence of the events A, B, and C, (1) a large amount of actual data in a case where the events A to C occur at the same time is required. However, in many cases, it is rare that the events A to C occur at the same time, and it is difficult to obtain actual data. (2) It is necessary to create a conditional probability table for a simultaneous occurrence of a plurality of events based on engineering knowledge such as FTA, and this work requires examination by an expert. Here, there is a problem in that it may be difficult to assign man-hours of the expert to such work. On the other hand, according to the present embodiment, by executing the process described with reference to FIG. 3 on the assumption that an inclusion relationship is established between the events, it is possible to easily estimate the causes of occurrence in consideration of the simultaneous occurrence of the events.

Without being limited to the above embodiment, for example, the cause estimation device 100 may determine presence or absence of an anomaly in the apparatus 10 based on a method other than the anomaly determination method based on the Mahalanobis distance, and may calculate a likelihood of an occurrence of an event based on a value other than the SN ratio related to the Taguchi method. For example, the cause estimation device 100 may calculate the Mahalanobis distance using the corrected measurement value as the specification without including the measurement value in the specifications, or may calculate the Mahalanobis distance without including the command value in the specifications. The noise removal process in step S8 can be omitted. In a case where the noise removal process is omitted, the cause estimation device 100 can be configured not to include the event extraction unit 109.

Second Embodiment

Hereinafter, a second embodiment will be described with reference to FIGS. 9 to 12.

Figure 9:
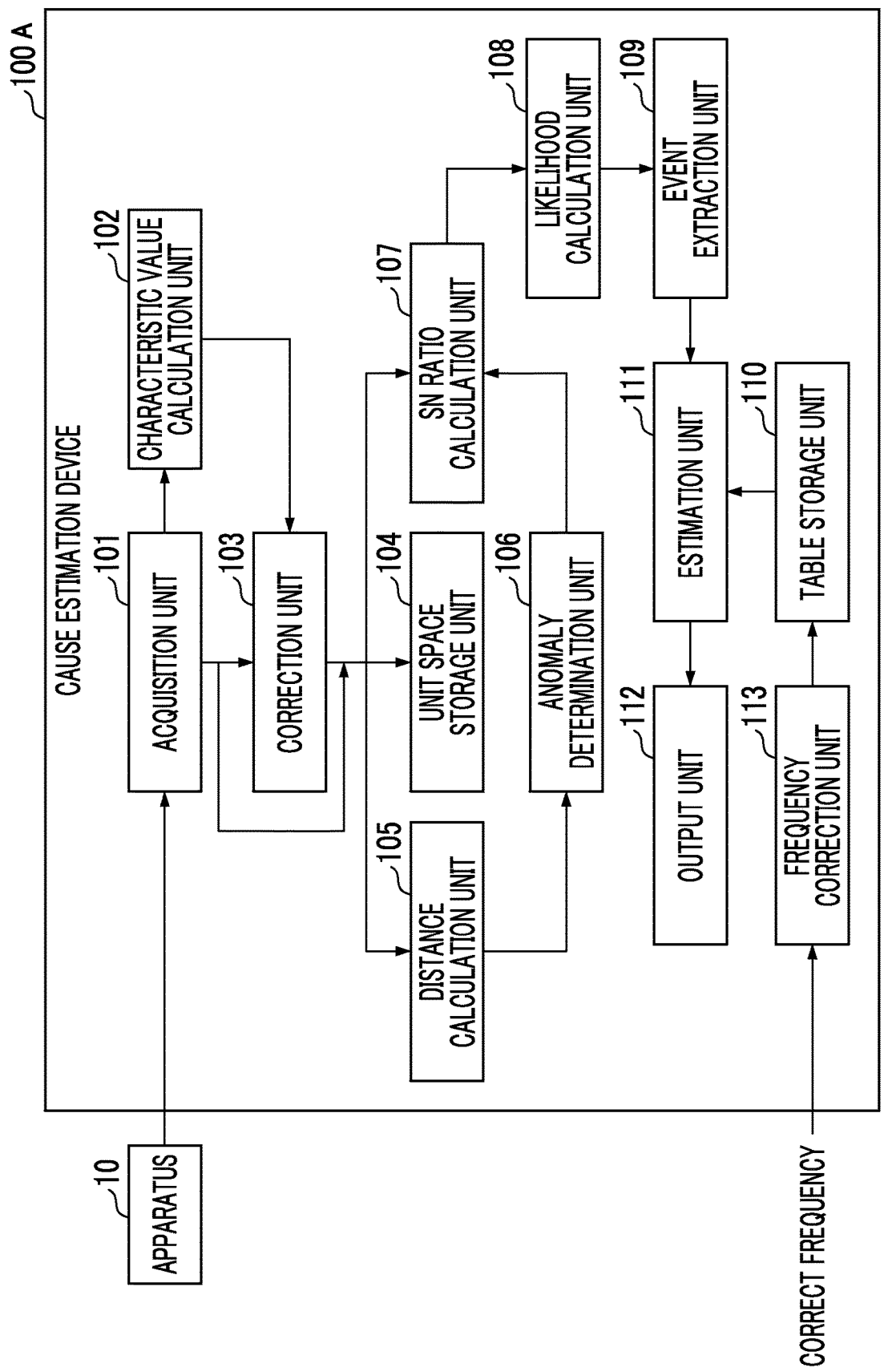
FIG. 9 is a block diagram showing an example of a cause estimation device according to a second embodiment.

FIG. 9 is a block diagram showing an example of a cause estimation device according to the second embodiment.

A cause estimation device 100A according to the second embodiment includes a frequency correction unit 113 in addition to the configuration of the first embodiment. The frequency correction unit 113 acquires a correction value of the occurrence frequency (number of times or probability) registered in the cause table, and rewrites the value in the cause table. As will be described below, in the second embodiment, an optional noise value is set for each event and each cause in the cause table from FTA, engineering knowledge, or the like, as necessary, to improve estimation precision (increase an estimation precision of a true cause and decrease an accuracy of a cause that is not the true cause).

FIG. 10 is referred to. In a cause table T13 of FIG. 10, a value "2" exists as a true value for a cause 1 and an event B, but a case where the event B occurs due to the cause 1 cannot be observed because a collection period of actual data is short. Therefore, a virtual situation in which the value is "0" is assumed. Based on this assumption, it is assumed that as a result of step S7, an SN ratio pattern of values as shown in a table T12 of FIG. 10 is obtained. Then, as shown in a table T14, as the cause of occurrence of the event estimated by the process described with reference to FIG. 3, only the cause 1 is estimated as the cause of occurrence. Here, assuming that values of a cause 2 and a cause 3 shown in the cause table T13 are true values, originally (in a situation where "2" is set for the cause 1 of the event B), it is considered that it is an error to estimate the cause 1 as the cause of occurrence of the event A. (originally, the cause 1 is a common cause of the events A and B, and is not appropriate as a cause in a case where an SN ratio of only the event A is 1.0.)

Next, FIG. 11 is referred to. Under the same assumption as above (registered contents of the cause table T13 are the same), it is assumed that an SN ratio pattern as illustrated in a table T15 of FIG. 11 is obtained this time. Then, as shown in a table T16, as the cause of occurrence of the event estimated by the process described with reference to FIG. 3, only the cause 3 is estimated as the cause of occurrence as a result. In the case of FIG. 11, originally, an accuracy of the cause 1 (value indicating frequency="2") has to be higher than that of the cause 3 (value indicating frequency="1").

It is considered that one of the causes of the erroneous estimation results as illustrated in FIGS. 10 and 11 is that the cause table is constructed based on actual results of anomalies or problems that actually occur. That is, since the occurrence of an anomaly or a problem is rare, and the occurrence frequency registered in the cause table is set based on an extremely small number of cases, uncertainty tends to be high. Therefore, in the second embodiment, an engineer who has knowledge about the cause of the occurrence of the anomaly of the apparatus 10 assigns a noise value according to the precision of the cause table. The noise value is set by the engineer according to, for example, the following rule. (1) A noise value is assigned in a case where an operation time of the apparatus 10 is short and it is suspected that data in the cause table is insufficient (that is, a case where it is considered that the precision of the cause table is insufficient). (2) The noise value is selected from a combination of an event and a cause having a value of "0", and a uniform value is assigned thereto. For example, such an operation of assigning "0.1" to one side and assigning "0.5" to the other side is not performed. (3) A magnitude of the noise value to be assigned does not exceed a maximum value in the cause table. For example, the magnitude is set to a value of 50% or less of the maximum value.

Figure 12:
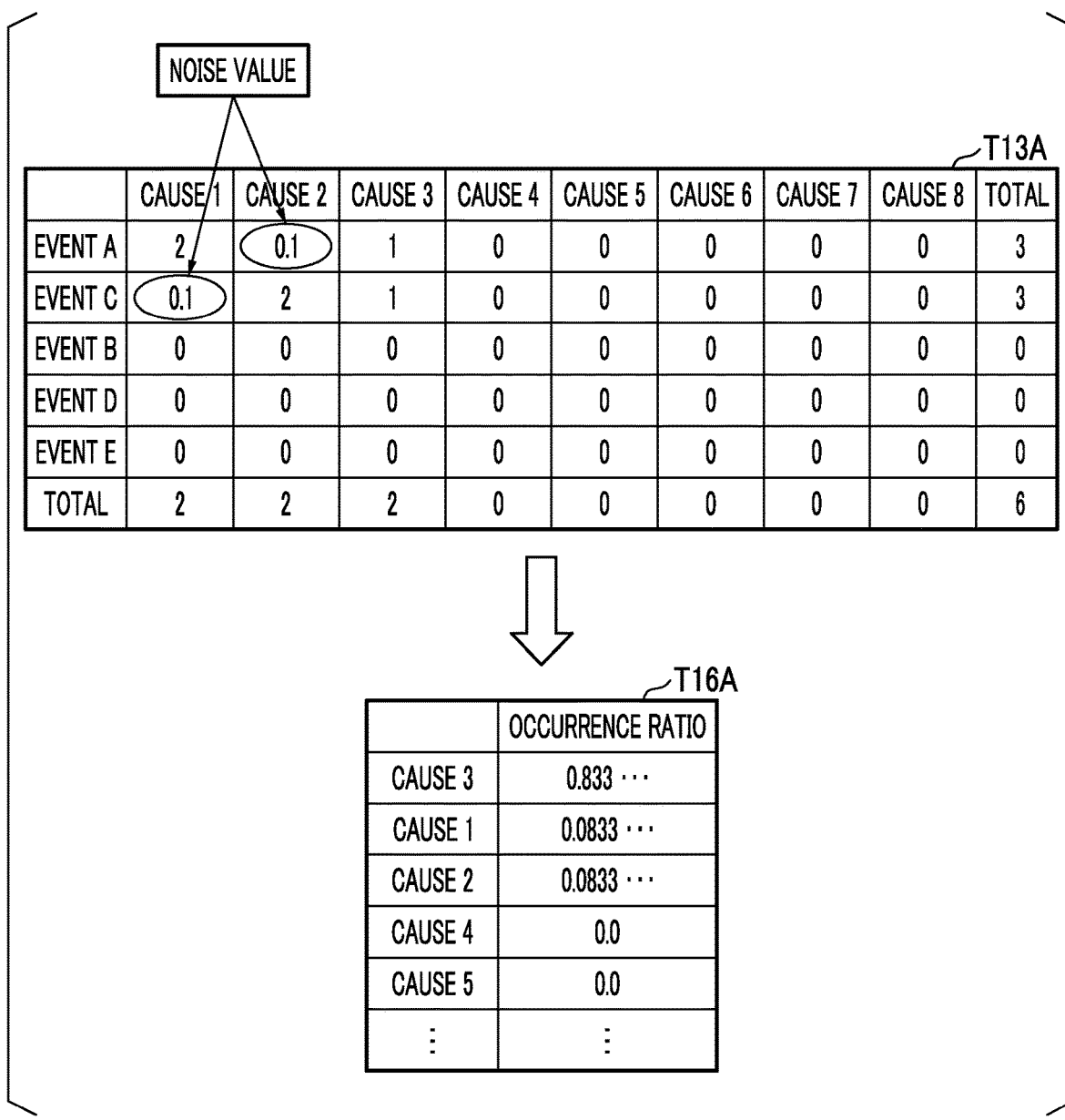
FIG. 12 is a third diagram describing the cause table correction process according to the second embodiment.

An example in which a noise value is assigned to the SN ratio pattern shown in the table T15 of FIG. 11 is shown in a table T13A of FIG. 12. A table T16A of FIG. 12 shows estimation results of the cause of occurrence of the event based on the cause table T13A and the table T15 after the noise value is assigned. With reference to the table T16A, since the noise value is assigned, the accuracy of the cause 1 and the cause 2 can be left to a certain extent without narrowing down the cause of occurrence to only the cause 3. It can be seen that by assigning the noise value, it is possible to prevent the accuracy of a true cause from being "0" and buried.

According to the second embodiment, it is possible to prevent the estimation precision of the cause of occurrence of the event from being decreased due to the uncertainty of the occurrence frequency of the cause table.

Third Embodiment

Hereinafter, a third embodiment will be described with reference to FIGS. 13 to 14.

Figure 13:
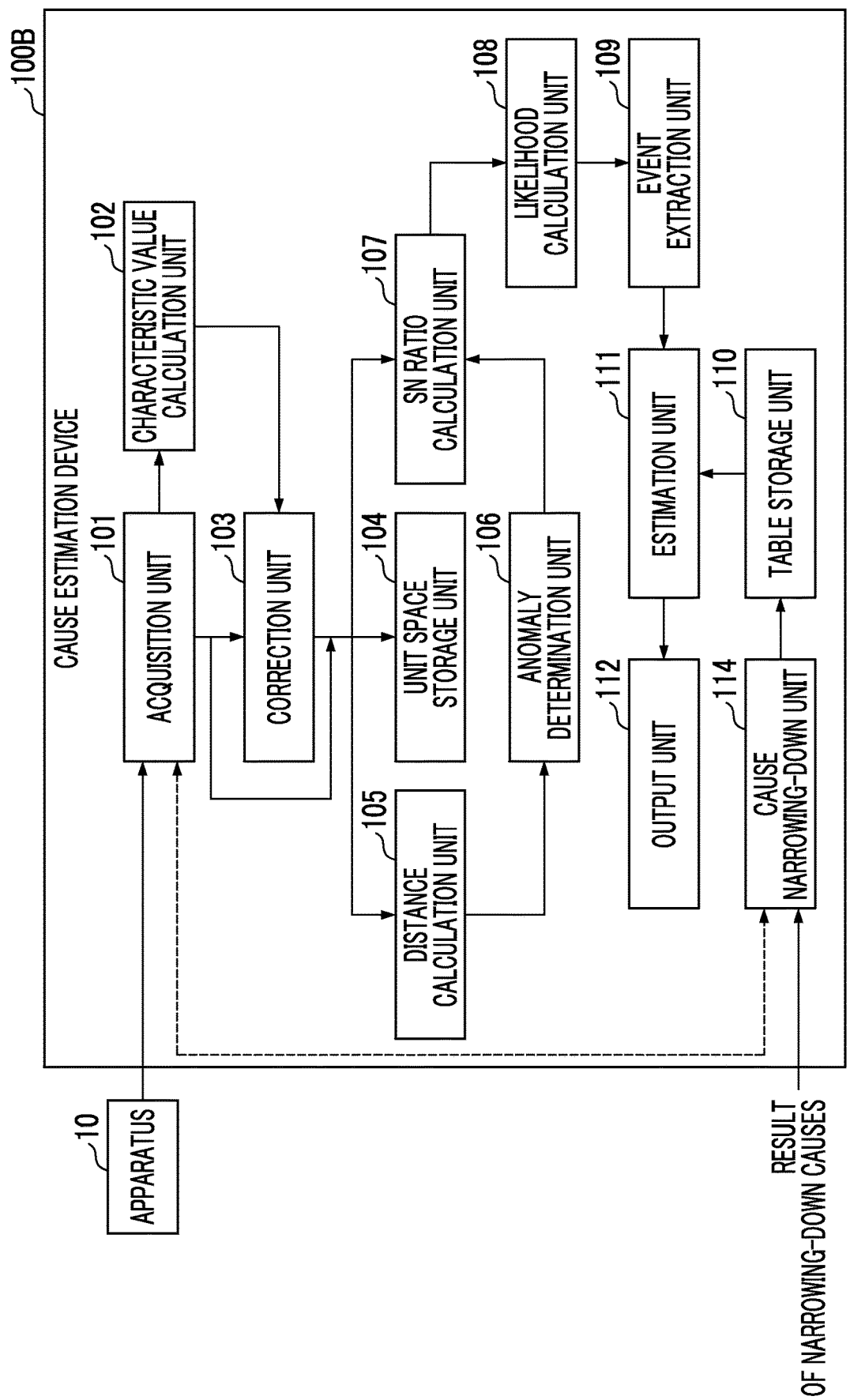
FIG. 13 is a block diagram showing an example of a cause estimation device according to a third embodiment.

FIG. 13 is a block diagram showing an example of a cause estimation device according to the third embodiment.

A cause estimation device 100B according to the third embodiment includes a cause narrowing-down unit 114 in addition to the configuration of the first embodiment. The cause narrowing-down unit 114 acquires information for narrowing down a cause registered in the cause table, and deletes the cause candidate itself for each event.

When estimating a cause from measurement values and the like when an anomaly occurs, as long as an appropriate sensor value is selected from an engineering viewpoint and it can be confirmed that there is no significant change in the sensor value, it is possible to narrow down accuracies of some cause candidates related to the sensor value and improve cause accuracies of other cause candidates. In the third embodiment, the estimation precision of the cause of occurrence of the event is improved in this manner.

FIG. 14 shows a list of cause names and cause accuracies analyzed by an engineer for an occurrence event called "change in performance of plant". "Defect in control system", "change in performance of exhaust gas boiler", "change in performance of auxiliary device", "malfunction in valve A", "malfunction in valve B", "change in performance of GT (gas turbine)", and "change in performance of generator" described in the "cause name" field of a table shown in FIG. 14 are causes of occurrence of "change in performance of plant" analyzed by the engineer who is familiar with the plant (apparatus 10) to be monitored. Similarly, "5", "15", "20", "30", "25", "4", and "1" described in the "cause accuracy %" field are accuracies of the causes set by the engineer who is familiar with the plant. This accuracy is the same as the probability associated with the node set in the FT, and is a value that is the probability registered in the cause table in a case where the occurrence frequency of the cause table is used as the probability.

In a case where the Mahalanobis distance, such as a sensor value related to "change in performance of plant", becomes equal to or more than the threshold during a plant operation (step S5), the engineer confirms the sensor value that is the basis of this determination. A confirmation result is shown in the "significant change in data of measurement point group" field of FIG. 14. In the case of the example of FIG. 14, it is assumed that no significant change is observed in the measurement point group related to the three causes of occurrence "change in performance of exhaust gas boiler", "malfunction in valve B", and "change in performance of GT". Then, among the seven causes shown in FIG. 14, the engineer deletes the three causes ("change in performance of exhaust gas boiler", "malfunction in valve B", and "change in performance of GT") related to the sensor value in which no significant change was observed with respect to "change in performance of plant" detected this time. Then, the respective accuracies "15", "25", and "4" related to the deleted causes are totaled, and the total value is proportionally divided by the number of remaining causes "4". Then, the value (="11") obtained by the proportional division is added to the original accuracies of the remaining causes. The value after the addition is shown in the "cause accuracy % (after narrowing down)" field of the table of FIG. 14. The distribution to the remaining causes may be even distribution or may be uneven distribution to specific causes. For the occurrence event "change in performance of plant", the engineer inputs an accuracy of 16% for "defect in control system", an accuracy of 0% for "change in performance of exhaust gas boiler", an accuracy of 31 for "change in performance of auxiliary device", an accuracy of 41% for "malfunction in valve A", an accuracy of 0% for "malfunction in valve B", an accuracy of 0% for "change in performance of GT (gas turbine)", and an accuracy of 12% for "change in performance of generator" to the cause estimation device 100B. The cause narrowing-down unit 114 acquires the input information and adds the input information to the cause table of the table storage unit 110. The estimation unit 111 estimates a cause for the event "change in performance of plant" detected this time, using the information added to the cause table. Accordingly, it is possible to estimate the cause of occurrence of the event by excluding the cause of occurrence that has no possibility, and thus it is possible to improve the estimation precision.

The cause deletion and the accuracy distribution process of the present embodiment may be executed by not the engineer but the cause narrowing-down unit 114. For example, the cause narrowing-down unit 114 stores a table T17 having data corresponding to each field of "occurrence event", "cause name", and "cause accuracy %" in the table illustrated in FIG. 14. For each cause, the cause narrowing-down unit 114 stores a group of measurement points related to the cause. Then, when an anomaly occurs, the cause narrowing-down unit 114 acquires the sensor value used for determining the occurrence of the anomaly from the acquisition unit 101, compares the sensor value with a predetermined threshold, and determines whether or not a change in the sensor value by the threshold or more has occurred during a predetermined period including before and after the occurrence of the anomaly. In a case where a change equal to or more than the threshold occurs, the cause narrowing-down unit 114 determines that a significant change has occurred in the sensor value, and otherwise, determines that no significant change has occurred. The cause narrowing-down unit 114 determines to delete the cause related to the measurement point group in which the sensor value in which no significant change has occurred is measured. Based on the table T17, the cause narrowing-down unit 114 totals the accuracies associated with the causes determined to be deleted, proportionally divides the total value by the number of remaining causes that are not to be deleted, performs a process of adding the proportionally divided value to the accuracy of each of the remaining causes, and creates a table T18 having data corresponding to each of the fields "occurrence event", "cause name", and "cause accuracy (after narrowing down)" of the table illustrated in FIG. 14. The cause narrowing-down unit 114 adds the information of the table T18 to the cause table of the table storage unit 110, and instructs the estimation unit 111 to execute cause estimation of the event detected this time based on the added information.

In a case where the number of occurrences is set instead of the probability in the occurrence frequency of the cause table, for example, the number of times associated with the causes determined to be deleted may be totaled, the total value may be proportionally divided by the number of remaining causes that are not deleted, a process of adding the number of occurrences after the proportional division to the number of occurrences of each of the remaining causes may be performed, and information for adding the information to the cause table may be created. Alternatively, information in which the number of times according to the accuracy is set for each cause in the table T18 may be added to the cause table.

According to the third embodiment, it is possible to estimate the cause of occurrence of the event by narrowing down to causes that are possible as the cause of occurrence, and it is possible to expect an improvement in the estimation precision. The third embodiment can be combined with the second embodiment.

Figure 15:
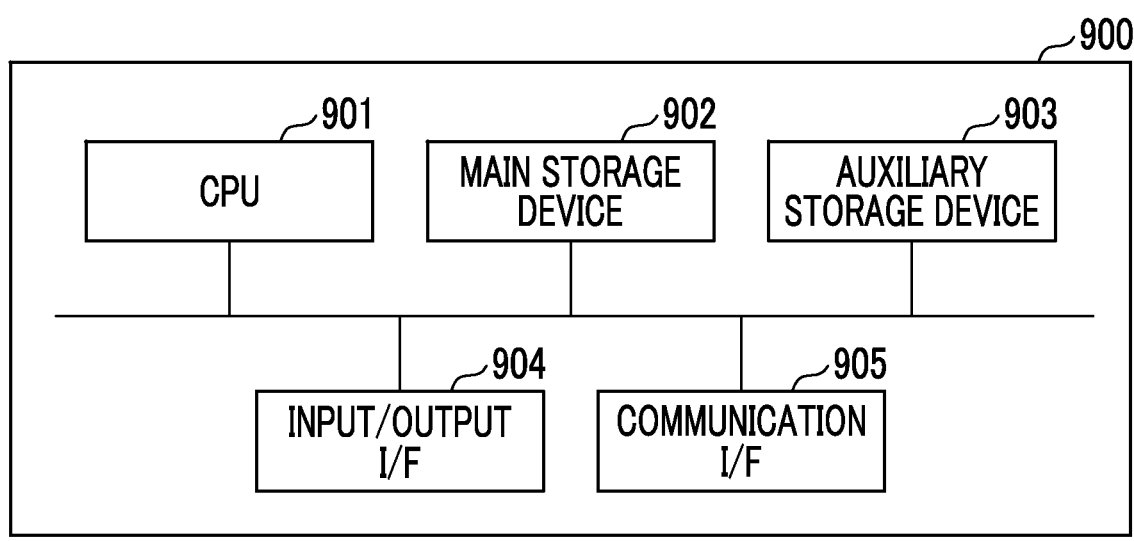
FIG. 15 is a diagram showing an example of a hardware configuration of the cause estimation device according to each of the embodiments.

FIG. 15 is a diagram showing an example of a hardware configuration of the cause estimation device according to each embodiment.

A computer 900 includes a CPU 901, a main storage device 902, an auxiliary storage device 903, an input/output interface 904, and a communication interface 905.

The cause estimation device 100, 100A, and 100B described above are mounted on the computer 900. Each of the above-described functions is stored in the auxiliary storage device 903 in the form of a program. The CPU 901 reads a program from the auxiliary storage device 903, deploys the program in the main storage device 902, and executes the above process according to the program. The CPU 901 secures a storage area in the main storage device 902 according to the program. The CPU 901 secures a storage area for storing data being processed in the auxiliary storage device 903 according to the program.

A program for realizing all or a part of the functions of the cause estimation devices 100, 100A, and 100B is recorded on a computer-readable recording medium, and the program recorded on the recording medium is read into a computer system and executed, whereby processes by each functional unit may be performed. The term "computer system" as used herein includes hardware such as an OS and peripheral devices. In a case where the WWW system is used, the "computer system" includes a homepage providing environment (or a display environment). The "computer-readable recording medium" refers to a portable medium such as a CD, DVD, or USB, or a storage device such as a hard disk embedded in the computer system. In a case where this program is distributed to the computer 900 via a communication line, the computer 900 to which the program is distributed may deploy the program into the main storage device 902 and execute the above processes. The above program may be for realizing a part of the above-described functions, or may be for realizing the above-described functions in combination with a program already recorded in the computer system.

As described above, although some embodiments according to the present disclosure have been described, all of these embodiments are presented as examples and are not intended to limit the scope of the invention. These embodiments can be implemented in various other embodiments, and various omissions, substitutions, and changes can be made without departing from the gist of the invention. These embodiments and modifications thereof are included in the scope and gist of the invention, as well as the scope of the inventions described in the claims and equivalents thereof.

ADDITIONAL NOTES

The cause estimation device, the cause estimation method, and the storage medium storing the program described in each of the embodiments are identified as follows, for example.

(1) The cause estimation devices 100, 100A, and 100B according to a first aspect include: the acquisition unit 101 that acquires a measurement value of the target apparatus 10; the likelihood calculation unit 108 that calculates, in a case where it is assumed that a plurality of events that can occur in the target apparatus 10 occur due to a common cause, a likelihood of an occurrence of each of the events based on the measurement value acquired by the acquisition unit 101; the table storage unit 110 that stores a cause table in which a cause of occurrence of the event and a frequency of the cause of occurrence are associated with each other for each of the plurality of events; and the estimation unit 111 that rewrites the frequency registered in the cause table into a frequency in the case where it is assumed that the plurality of events occur due to the common cause, and estimates the cause of occurrence based on the rewritten cause table and the likelihood.

Accordingly, the cause of occurrence of the event can be estimated by correcting the likelihood of the occurrence of the event to a value considering that the plurality of events occur due to the common cause, and also correcting the frequency registered in the cause table to a frequency considering that the plurality of events occur due to the common cause, so that estimation precision of the cause of occurrence of the event in the case where the plurality of events occur due to the common cause can be improved.

(2) The cause estimation devices 100, 100A, and 100B according to a second aspect are the cause estimation devices 100, 100A, and 100B according to (1), in which the likelihood calculation unit 108 rearranges the events in descending order of the likelihood, and calculates the likelihood in the case where it is assumed that the plurality of events occur due to the common cause by setting a value obtained by subtracting, from the likelihood corresponding to a first event, the likelihood corresponding to the event one rank lower than the first event in the rearranged order, as the likelihood corresponding to the first event.

Accordingly, the likelihood of the occurrence of the event can be corrected to a value in the case where it is assumed that the plurality of events occur simultaneously due to the common cause.

(3) The cause estimation devices 100, 100A, and 100B according to a third aspect are the cause estimation devices 100, 100A, and 100B according to (1) and (2), in which the estimation unit 111 rearranges the cause table for the events in the same order as when the events are rearranged in descending order of the likelihood, and the cause table is rewritten by setting a value obtained by subtracting, from the frequency for each cause of occurrence corresponding to a first event, the frequency for each cause of occurrence corresponding to the event one rank lower than the first event in the rearranged order, as the frequency for each cause of occurrence corresponding to the first event.

Accordingly, the frequency registered in the cause table can be corrected to a frequency in the case where it is assumed that the plurality of events occur simultaneously due to the common cause.

(4) The cause estimation devices 100, 100A, and 100B according to a fourth aspect are the cause estimation devices 100, 100A, and 100B according to (1) to (3), in which, in the cause table, the cause of occurrence, the event, and the number of times the event is confirmed when an anomaly related to the cause of occurrence occurs are associated with each other, and the estimation unit calculates a weighted sum of the likelihood and the number of times for each cause of occurrence, and estimates the cause of occurrence based on the weighted sum.

Accordingly, the cause of occurrence can be estimated based on an actual value of the number of occurrences for each cause of occurrence.

(5) The cause estimation devices 100, 100A, and 100B according to a fifth aspect are the cause estimation devices 100, 100A, and 100B according to (1) to (3), in which, in the cause table, the cause of occurrence, the event, and a probability that the event is confirmed when an anomaly related to the cause of occurrence occurs are associated with each other, and the estimation unit calculates a weighted sum of the likelihood and the probability for each cause of occurrence, and estimates the cause of occurrence based on the weighted sum.

Accordingly, the cause of occurrence can be estimated based on the occurrence probability of each cause of occurrence. The occurrence probability may be derived from an FT created from engineering knowledge about the target apparatus.

(6) The cause estimation devices 100, 100A, and 100B according to a sixth aspect are the cause estimation devices 100, 100A, and 100B according to (1) to (5), in which the case where it is assumed that the plurality of events occur due to the common cause is a case in which, in a case where the event is represented by a closed space having an area corresponding to a magnitude of the likelihood that the event occurs, for each of the plurality of events, a relationship in which the closed space of the event is included in a closed space of the event having the next smallest likelihood after the event is established.

By assuming such an inclusion relationship, the likelihood (SN ratio) of the occurrence the event and the frequency of the cause table can be corrected to values in the case where it is assumed that the plurality of events that can occur in the target apparatus occur simultaneously due to the common cause by the difference process in steps S9 and S11.

(7) The cause estimation device 100A according to a seventh aspect is the cause estimation device 100A according to (1) to (6), and further includes: the frequency correction unit 113 that receives setting of a predetermined noise value for an item having a frequency of 0 set in the cause table, and updates the frequency registered in the cause table based on the setting.

Accordingly, it is possible to compensate for an uncertainty of the frequency registered in the cause table and maintain an estimation precision of the cause.

(8) The cause estimation device 100B according to an eighth aspect is the cause estimation device 100B according to (1) to (7), and further includes: the cause narrowing-down unit that receives information for deleting the cause set in the cause table and sets the frequency related to the cause to be deleted to 0 based on the information.

For example, in a case where there is a cause of occurrence that can be determined not to be the cause of occurrence of the current event from the measurement values measured at the time of the occurrence of the event, the cause of occurrence is deleted from the cause table (the frequency of the cause is set to 0), thereby improving the estimation precision of the cause.

(9) The cause estimation device 100B according to a ninth aspect is the cause estimation device 100B according to (1) to (7), and further includes: a cause narrowing-down unit that determines, based on the measurement value, to delete the cause set in the cause table related to the measurement value in a case where the measurement value does not change by a predetermined threshold or more, and sets the frequency related to the cause to be deleted to 0.

In a case where there is no significant change in the measurement value when the event occurs, it is determined that the cause of occurrence related to the measurement value is not the cause of occurrence of the current event, and the cause of occurrence is deleted from the cause table (the frequency of the cause is set to 0), thereby improving the estimation precision of the cause.

(10) The cause estimation method according to a tenth aspect includes: acquiring a measurement value of a target apparatus; calculating, in a case where it is assumed that a plurality of events that may occur in the target apparatus occur due to a common cause, a likelihood of an occurrence of each of the events based on the acquired measurement value; and rewriting a frequency registered in a cause table in which a cause of occurrence of the event and the frequency of the cause of occurrence are associated with each other for each of the plurality of events, into a frequency in the case where it is assumed that the plurality of events occur due to the common cause, and estimating the cause of occurrence based on the rewritten cause table and the likelihood.

The non-transitory computer-readable storage medium storing the program according to an eleventh aspect causes the computer 900 to execute: acquiring a measurement value of a target apparatus; calculating, in a case where it is assumed that a plurality of events that may occur in the target apparatus occur due to a common cause, a likelihood of an occurrence of each of the events based on the acquired measurement value; and rewriting a frequency registered in a cause table in which a cause of occurrence of the event and the frequency of the cause of occurrence are associated with each other for each of the plurality of events, into a frequency in the case where it is assumed that the plurality of events occur due to the common cause, and estimating the cause of occurrence based on the rewritten cause table and the likelihood.

INDUSTRIAL APPLICABILITY

According to the cause estimation device, the cause estimation method, and the storage medium storing the program described above, a cause of an event can be estimated with good precision.

REFERENCE SIGNS LIST 100, 100A, 100B: cause estimation device
101: acquisition unit
102: characteristic value calculation unit
103: correction unit
104: unit space storage unit
105: distance calculation unit
106: anomaly determination unit
107: SN ratio calculation unit
108: likelihood calculation unit
109: event extraction unit
110: table storage unit
111: estimation unit
112: output unit
113: frequency correction unit
114: cause narrowing-down unit
900: computer
901: CPU
902: main storage device
903: auxiliary storage device
904: input/output interface
905: communication interface

The invention claimed is:

1. A cause estimation device comprising:
an input/output interface;
a storage device;
a central processing unit (CPU) that:
    acquires a measurement value of a target apparatus;
    calculates, in a case where it is assumed that a plurality of events that occur in the target apparatus occur due to a common cause, a likelihood of an occurrence of each of the events based on the measurement value that has been acquired;
    stores, in the storage device, a cause table in which a cause of occurrence of the event and a frequency of the cause of occurrence are associated with each other for each of the events;
    rewrites the frequency registered in the cause table into a frequency in the case where it is assumed that the events occur due to the common cause, and estimates the cause of occurrence based on the rewritten cause table and the likelihood;
    receives setting of a predetermined noise value for an item having a frequency of 0 set in the cause table, and updates the frequency registered in the cause table based on the setting; and
    outputs, via the input/output interface, the cause of occurrence that has been estimated in order of the likelihood.

2. The cause estimation device according to claim 1, wherein
the CPU rearranges the events in descending order of the likelihood, and calculates the likelihood in the case where it is assumed that the events occur due to the common cause by setting a value obtained by subtracting, from the likelihood corresponding to a first event, the likelihood corresponding to the event one rank lower than the first event in the rearranged order, as the likelihood corresponding to the first event.

3. The cause estimation device according to claim 1, wherein
the CPU rearranges the cause table for the events in the same order as when the events are rearranged in descending order of the likelihood, and
the cause table is rewritten by setting a value obtained by subtracting, from the frequency for each cause of occurrence corresponding to a first event, the frequency for each cause of occurrence corresponding to the event one rank lower than the first event in the rearranged order, as the frequency for each cause of occurrence corresponding to the first event.

4. The cause estimation device according to claim 1, wherein
in the cause table, the cause of occurrence, the event, and the number of times the event is confirmed when an anomaly related to the cause of occurrence occurs are associated with each other, and
the CPU calculates a weighted sum of the likelihood and the number of times for each cause of occurrence, and estimates the cause of occurrence based on the weighted sum.

5. The cause estimation device according to claim 1, wherein
in the cause table, the cause of occurrence, the event, and a probability that the event is confirmed when an anomaly related to the cause of occurrence occurs are associated with each other, and
the CPU calculates a weighted sum of the likelihood and the probability for each cause of occurrence, and estimates the cause of occurrence based on the weighted sum.

6. The cause estimation device according to claim 1, wherein
the case where it is assumed that the events occur due to the common cause is a case in which, in a case where the event is represented by a closed space having an area corresponding to a magnitude of the likelihood that the event occurs, for each of the events, a relationship in which the closed space of the event is included in a closed space of the event having the next smallest likelihood after the event is established.

7. The cause estimation device according to claim 1, wherein
the CPU receives information for deleting the cause set in the cause table and sets the frequency related to the cause to be deleted to 0 based on the information.

8. The cause estimation device according to claim 1, wherein
the CPU determines, based on the measurement value, to delete the cause set in the cause table related to the measurement value in a case where the measurement value does not change by a predetermined threshold or more, and sets the frequency related to the cause to be deleted to 0.

9. A cause estimation method using a cause estimation device that comprises an input/output interface, a storage device, and a central processing unit (CPU), the method comprising:
acquiring a measurement value of a target apparatus;
calculating, in a case where it is assumed that a plurality of events that occur in the target apparatus occur due to a common cause, a likelihood of an occurrence of each of the events based on the acquired measurement value; and
storing, in the storage device, a cause table in which a cause of occurrence of the event and a frequency of the cause of occurrence are associated with each other for each of the events;
rewriting the frequency registered in the cause table into a frequency in the case where it is assumed that the events occur due to the common cause, and estimating the cause of occurrence based on the rewritten cause table and the likelihood;
receiving setting of a predetermined noise value for an item having a frequency of 0 set in the cause table, and updates the frequency registered in the cause table based on the setting; and
outputting, via the input/output interface, the cause of occurrence that has been estimated in order of the likelihood.

10. A non-transitory computer-readable storage medium storing a program that causes a cause estimation device that comprises an input/output interface, a storage device, and a central processing unit (CPU) to execute:
acquiring a measurement value of a target apparatus;
calculating, in a case where it is assumed that a plurality of events that may occur in the target apparatus occur due to a common cause, a likelihood of an occurrence of each of the events based on the acquired measurement value; and
storing, in the storage device, a cause table in which a cause of occurrence of the event and a frequency of the cause of occurrence are associated with each other for each of the events;
rewriting the frequency registered in the cause table into a frequency in the case where it is assumed that the events occur due to the common cause, and estimating the cause of occurrence based on the rewritten cause table and the likelihood;
receiving setting of a predetermined noise value for an item having a frequency of 0 set in the cause table, and updating the frequency registered in the cause table based on the setting; and
outputting, via the input/output interface, the cause of occurrence that has been estimated in order of the likelihood.

* * * * *